(12) United States Patent
Martinez Tossas (10) Patent No.: US 12,066,002 B2
(45) Date of Patent: Aug. 20, 2024

(54) NEGATIVE TIP VORTICES BLADE

(71) Applicant: Alliance for Sustainable Energy, LLC, Golden, CO (US)

(72) Inventor: Luis Antonio Martinez Tossas, Boulder, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 0 days.

(21) Appl. No.: 18/533,401

(22) Filed: Dec. 8, 2023

(65) Prior Publication Data

US 2024/0191686 A1  Jun. 13, 2024

Related U.S. Application Data

(60) Provisional application No. 63/386,529, filed on Dec. 8, 2022.

(51) Int. Cl.
*F03D 1/06* (2006.01)

(52) U.S. Cl.
CPC ...... *F03D 1/0633* (2013.01); *F05B 2240/307* (2020.08)

(58) Field of Classification Search
CPC ............ F03D 1/0633; F05B 2240/307
See application file for complete search history.

(56) References Cited

U.S. PATENT DOCUMENTS

| | | | |
|---|---|---|---|
| 6,431,499 B1 | 8/2002 | La Roche et al. | |
| 6,484,968 B2 | 11/2002 | Felker | |
| 7,644,892 B1 | 1/2010 | Alford, Jr. et al. | |
| 7,927,078 B2 | 4/2011 | Parsania et al. | |
| 8,366,056 B2 | 2/2013 | Garang | |
| 9,046,111 B2 | 6/2015 | Harvey et al. | |
| 9,120,562 B2 | 9/2015 | Speer | |
| 9,670,900 B2 | 6/2017 | Carroll et al. | |
| 10,005,546 B2 | 6/2018 | Gratzer | |
| 10,047,719 B2 | 8/2018 | Koegler et al. | |
| 10,053,209 B2 | 8/2018 | Speer | |
| 10,252,793 B2 | 4/2019 | Gratzer | |

(Continued)

FOREIGN PATENT DOCUMENTS

| WO | WO-2013137716 A2 * | 9/2013 | ............... F01D 5/14 |
|---|---|---|---|
| WO | 2022-002334 A1 | 1/2022 | |

OTHER PUBLICATIONS

Akbari et al., "Multi-Objective Optimization of a Small Horizontal-Axis Wind Turbine Blade for Generating the Maximum Startup Torque at Low Wind Speeds", Machines, 2022, vol. 10, No. 785, pp. 1-21.

(Continued)

*Primary Examiner* — Aaron R Eastman
(74) *Attorney, Agent, or Firm* — Alexandra M. Hall (57) ABSTRACT

A design for wind turbine rotor blades, aircraft wings, and/or other aerodynamic applications which may reduce the vorticity downstream and thus improve lift is described. The blade designs may include an increase in the blade chord towards the tip of the blade, a change in the twist angle at least once along the length of the blade, and/or a change in the thickness of the blade at least once along the length of the blade. These changes individually or in combination may allow for the creation of a counter-rotating vortex behind the blade, increasing power generation and/or lift.

18 Claims, 6 Drawing Sheets

(56) References Cited

U.S. PATENT DOCUMENTS

| | | | |
|---|---|---|---|
| 10,589,846 | B2 | 3/2020 | Gratzer |
| 2009/0022598 | A1* | 1/2009 | Enevoldsen .......... F03D 1/0633 |
| | | | 416/223 R |
| 2009/0297355 | A1* | 12/2009 | Herr ...................... F03D 1/0633 |
| | | | 416/223 R |
| 2010/0329879 | A1 | 12/2010 | Presz, Jr. et al. |
| 2012/0070281 | A1 | 3/2012 | Fuglsang et al. |
| 2016/0177919 | A1 | 6/2016 | Van Garrel et al. |
| 2016/0369770 | A1* | 12/2016 | Vuillaume ............ F03D 1/0691 |
| 2017/0089322 | A1* | 3/2017 | Liu ........................... F03D 1/06 |
| 2018/0230966 | A1 | 8/2018 | Drachmann Haag |
| 2019/0316565 | A1 | 10/2019 | Wang et al. |
| 2020/0088161 | A1* | 3/2020 | Carroll .................. F03D 1/0641 |
| 2021/0062781 | A1 | 3/2021 | Nakaye et al. |

OTHER PUBLICATIONS

Chudzik et al., "Wind Microturbine with Adjustable Blade Pitch Angle", Energies, 2023, vol. 16, No. 945, pp. 1-16.

Hemami, "Are Turbine Blades With Variable Twist Angle Practical?", Windtech Future, WindTech International, Aug. 3, 2022, available at https://www.windtech-international.com/windtech-future/are-turbine-blades-with-variable-twist-angle-practical, pp. 1-5.

Khlaifat et al., "A review of the key sensitive parameters on the aerodynamic performance of a horizontal wind turbine using Computational Fluid Dynamics modelling", AIMS Energy, 2020, vol. 8, No. 3, pp. 493-524.

Kim, "Numerical Analysis and Optimization of Wing-tip Designs", A project present to The Faculty of the Department of Aerospace Engineering San José State University in partial fulfillment of the requirements for the degree Master of Science in Aerospace Engineering, May 2015, available at https://www.sjsu.edu/ae/docs/project-thesis/Uram.Kim-S15.pdf, pp. 1-74.

Martínez-Tossas et al., "Filtered lifting line theory and application to the actuator line model", Journal of Fluid Mechanics, 2019, vol. 863, pp. 269-292.

Martínez-Tossas et al., "Generalized filtered lifting line theory for arbitrary chord lenghts and application to wind turbine blades", Wind Energy, 2023, pp. 1-6.

Rajendran, "Design of Parametric Winglets and Wing tip devices—A Conceptual Design Approach", Linkoping University Institute of Technology Department of Management and Engineering (IEI), available at https://www.diva-portal.org/smash/get/diva2:547954/FULLTEXT01.pdf, 2012, pp. 1-61.

Scott et al., "Evolution of eddy viscosity in the wake of a wind turbine", Wind Energy Science Discussions, European Academy of Wind Energy (eawe), 2023, vol. 8, pp. 449-463.

Shaler et al., "Comparison of Free Vortex Wake and BEM Structural Results Against Large Eddy Simulations Results for Highly Flexible Turbines Under Challenging Inflow Conditions", Wind Energy Science Discussions, European Academy of Wind Energy (eawe), Jan. 12, 2022, pp. 1-22.

Vijayakumar et al., "Design-space exploration for inverse-design of wind turbine blades using data-driven methods", AIAA SciTech Forum, Jan. 2022, San Diego, CA, pp. 1-19.

Young et al., "Progress in Optimal Blade Design Considering Dynamics of Unsteady Floating Platforms", NAWEA / WindTech, 2022, pp. 1-16.

International Search Report and Written Opinion for International (PCT) Application PCT/US23/83043, Date of Mailing Mar. 13, 2024, pp. 1-9.

* cited by examiner

NEGATIVE TIP VORTICES BLADE

CROSS-REFERENCE TO RELATED APPLICATIONS

This application claims priority to U.S. Provisional Patent Application No. 63/386,529 filed on Dec. 8, 2023, the contents of which are incorporated herein by reference in their entirety.

CONTRACTUAL ORIGIN

This invention was made with United States government support under Contract No. DE-AC36-08GO28308 awarded by the U.S. Department of Energy. The United States government has certain rights in this invention.

BACKGROUND

Wind energy is a mainstream source of electricity generation worldwide. The fundamental theories used to develop wind energy science (and the designs of wind turbine blades) were derived more than 100 years ago. These theories are still being used to design wind turbines today. For this reason, wind turbines operate sub-optimally and cannot achieve their maximum potential. To tackle climate change, one of the biggest challenges facing humanity today, the full potential of wind energy extraction must be realized. Thus, there remains a need for modern approaches to wind turbine blade design.

SUMMARY

An aspect of the present disclosure is a blade including a length having a first end and a second end, and a leading edge, a tailing edge, and a chord between the leading edge and the tailing edge, in which the chord is substantially perpendicular to the length, the chord has a local chord minimum at a first inflection point, the chord has a local chord maximum at a second inflection point, and the local chord maximum is closer to the second end than the local chord minimum. In some embodiments, the blade also includes a twist, in which the twist has a local angle minimum at the first inflection point, the twist has a local angle maximum at the second inflection point, and the local angle maximum is closer to the second end than the local angle minimum. In some embodiments, the local angle maximum is in the range of approximately 1° to approximately 15° larger than the local angle minimum. In some embodiments, the first inflection point is located at approximately 90% of the length. In some embodiments, the first inflection point is located at approximately 95% of the length. In some embodiments, the first inflection point is located at approximately 97% of the length. In some embodiments, the second inflection point is located at approximately 90% of the length. In some embodiments, the second inflection point is located at approximately 95% of the length. In some embodiments, the second inflection point is located at approximately 97% of the length. In some embodiments, the local chord maximum is in the range of 0.5 m to 5 m larger than the local chord minimum. In some embodiments, the wind turbine blade has a power coefficient in the range of approximately 0.45 to approximately 0.55. In some embodiments, the wind turbine blade has a thrust coefficient in the range of approximately 0.75 to approximately 0.95.

An aspect of the present disclosure is a blade including a length having a first end and a second end; and a leading edge, a tailing edge, and a chord between the leading edge and the tailing edge, in which the chord is substantially perpendicular to the length, the chord has a first length at a first inflection point, the chord has a second measurement at a second inflection point, the chord has a third measurement at a third inflection point, the chord has a fourth measurement at a fourth inflection point, and the third measurement is less than the second measurement and the fourth measurement. In some embodiments, the blade also includes a twist which includes a first pitch angle at the first inflection point, a second pitch angle at the second inflection point, a third pitch angle at the third inflection point, and a fourth pitch angle at the fourth inflection point, in which the third pitch angle is less than the second pitch angle and the fourth pitch angle. In some embodiments, the second pitch angle and the fourth pitch angle are in the range of approximately 1° to approximately 15° larger than the third pitch angle. In some embodiments, the second measurement is approximately 4 m larger than the third measurement, and the fourth measurement is approximately 1 m larger than the third measurement. In some embodiments, the chord has a fifth measurement at the second end, and the fifth measurement is smaller than the first measurement, the second measurement, the third measurement, or the fourth measurement. In some embodiments, the third inflection point and the fourth inflection point are located within approximately 90% of the length. In some embodiments, the wind turbine blade has a power coefficient in the range of approximately 0.45 to approximately 0.55. In some embodiments, the wind turbine blade has a thrust coefficient in the range of approximately 0.75 to approximately 0.95.

BRIEF DESCRIPTION OF THE DRAWINGS

Some embodiments of the present disclosure are illustrated in the referenced figures of the drawings. It is intended that the embodiments and figures disclosed herein are to be considered illustrative rather than limiting.

FIG. 6A illustrates an embodiment of the blade design for use in aircraft wing or airfoil.

REFERENCE NUMERALS

100 . . . blade design
105 . . . trailing edge
110 . . . leading edge
115 . . . chord 120 . . . length
125 . . . first end

DESCRIPTION

The embodiments described herein should not necessarily be construed as limited to addressing any of the particular problems or deficiencies discussed herein. References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" is defined as approaching a specific numeric value or target to within 20%, 15%, 10%, 5%, or within 1% of the value or target. In further embodiments of the present invention, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to +20%, +15%, +10%, +5%, or +1% of a specific numeric value or target. In some embodiments of the present invention, the term "about" is used to indicate an uncertainty limit of less than or equal to +1%, +0.9%, +0.8%, +0.7%, +0.6%, +0.5%, +0.4%, +0.3%, +0.2%, or +0.1% of a specific numeric value or target.

Among other things, the present disclosure relates to a design for wind turbine rotor blades, aircraft wings, and/or other aerodynamic applications which may reduce the vorticity downstream and thus improve lift. The blade designs of the present disclosure may include an increase in the blade chord towards the tip of the blade, a change in the twist angle at least once along the length of the blade, and/or a change in the thickness of the blade at least once along the length of the blade. In some embodiments, the blade design may include a change in the cross-sectional shape at least once along the length of the blade. These changes individually or in combination may allow for the creation of a counter-rotating vortex behind the blade, increasing power generation and/or lift. The blade design of the present disclosure may be applied to wind turbines blades, turbine blades, aircraft wings, or other aerodynamic applications where a wing, blade, or rotor is used.

A wind turbine is a device that converts the kinetic energy of the wind into usable electrical energy. Blades, connected to a shaft via a hub, rotate when they encounter wind. Into a nacelle, the shaft rotates, and a generator converts that rotational energy into electrical energy. In terms of aerodynamics, the blade of a wind turbine may be thought of as a rotating wing. In traditional blade theory (known as blade element momentum theory or BEM), it is assumed that changes in one part of the blade do not affect the performance of other parts of the plane. However, the theory of blade performance and design of the present disclosure recognizes that changes in any part of the blade impact the performance of all other parts of the blade.

The blade design of the present disclosure has the objective of maximizing (or substantially increasing) the aerodynamic power coefficient ($C_P$) as predicted by a free-wake vortex (FWV) model of blade theory. In some embodiments, the blade design includes increasing the chord near the tip of the blade while simultaneously changing the twist angle. The blade design of the present disclosure is intended to generate a vortex that counters the tip vortex on the blade (i.e., they aim to neutralize the effects of the tip vortices). This may be accomplished by the blade designs of the present disclosure generating two counter rotating vortices (see FIG. 4) whereby the two vortices substantially counteract each other.

As used herein, "twist angle" refers to the angle between the chord at a given point of the blade and the chord of the blade at the base. The "twist angle" may also be thought of as the blade angle. It is a measure of the change in angle of the blade along the length of the blade.

In some embodiments, the blade design of the present disclosure includes increasing the chord near the tip (i.e., the end away from the connection to the hub nacelle or aircraft fuselage) while simultaneously changing the twist angle. These changes can introduce negative gradients in the air circulation, with the goal of generating counter-rotating vortices that may reduce the parasitic effects of typical vortex dynamics on the overall blade dynamics (see FIG. 4). For wind turbine blades, this may result in improved power generation. For aircraft wings, this may improve lift.

Figure 1:
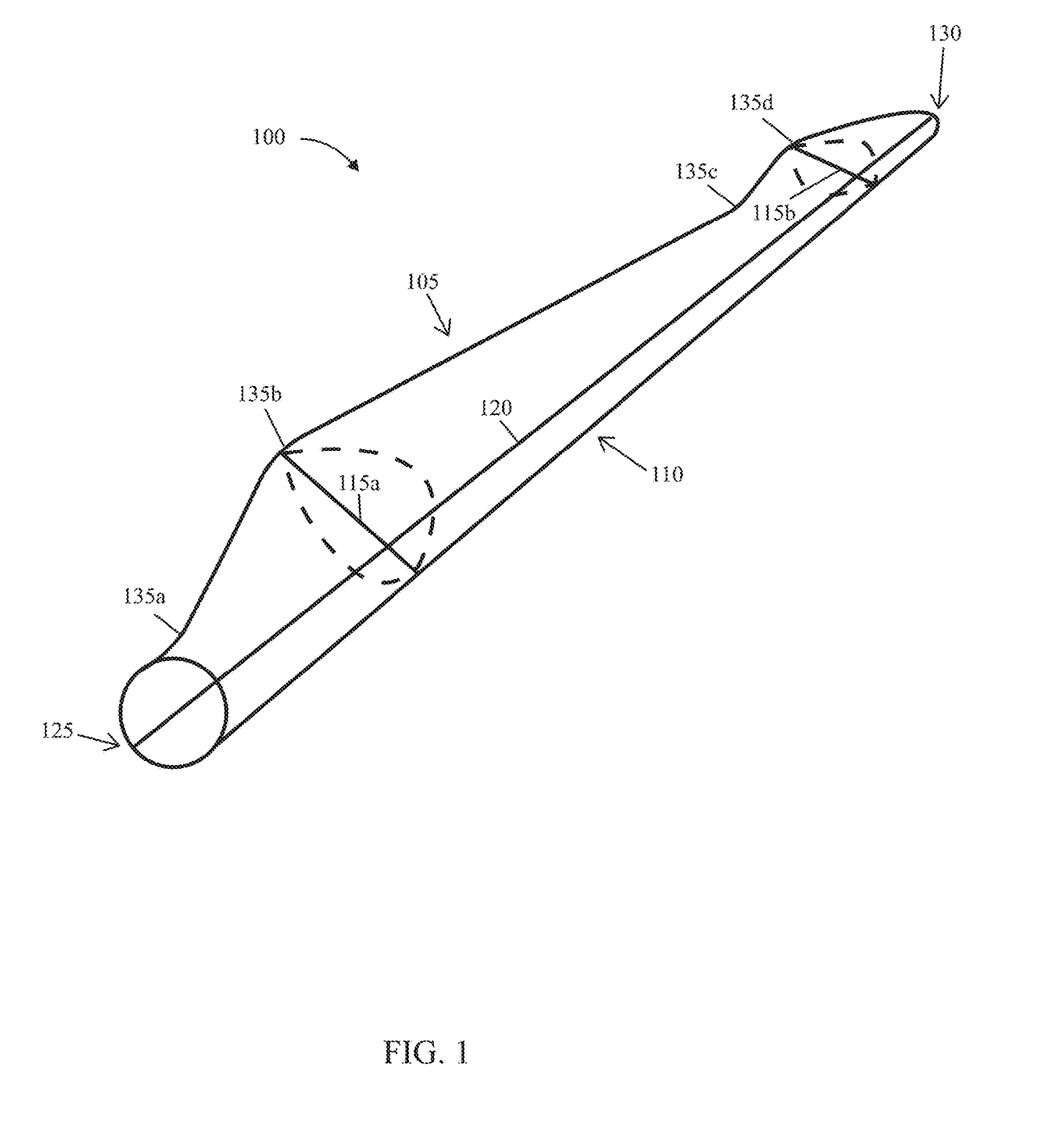
FIG. 1 illustrates the components of a blade design, according to some aspects of the present disclosure.

FIG. 1 illustrates the components of a blade design 100, according to some aspects of the present disclosure. In some embodiments, as shown in FIG. 1, the blade design 100 includes a length 120 spanning between the first end 125 and a second end 130. The blade design 100 includes a first end 125 which may be connected to the hub and/or nacelle or an aircraft fuselage and a second end 130 located away from the hub and/or nacelle or the aircraft fuselage. The second end 130 may also be referred to as the tip. The blade design 100 includes a chord 115 which substantially perpendicular to the length 120. The chord 115 is a measure of the cross-section of the blade design 100, as measured between the leading edge 110 to the trailing edge 105. The chord 115 may have multiple measurements along the length 120 (for example, the chord 115 has a first measurement at a first inflection point 135a, a second measurement at a second inflection point 135b, a third measurement at a third inflection point 135c, and a fourth measurement at a fourth inflection point 135d).

Typically, in traditional blades (not shown in FIG. 1) the chord decreases along the length, especially near the second end 130. That is, in traditional blades the chord tapers off near the tip. However, in the blade design 100 of the present disclosure, the chord 115 decreases along most of the length 120, reaching a local (or relative) minimum at inflection point 135c and then increases (reaching a local (or relative) maximum) at inflection point 135d near the second end 130. In some embodiments, the blade design 100 may have an increased chord 115 size toward the second end 130 and then a sudden decrease again at the second end 130. Specifically, the chord 115 may have a first measurement (i.e., value) at a first inflection point 135a, a second measurement at a second inflection point 135b, a third measurement at a third inflection point 135c, and a fourth measurement at a fourth inflection point 135d. The increase in chord 115 near the second end 130 may be the result of the third measurement being less than the second measurement and the fourth measurement (i.e., at the third inflection point 135c the chord 115 is at a relative minimum). As shown in FIG. 1, the chord 115 increase is mostly on the trailing edge 105, although in some embodiments the chord 115 increase may be along the leading edge 110. In some embodiments, the chord 115 and/or twist angle may have multiple local maxima and local minima along the length 120. That is, in some embodiments, multiple increases in chord 115 and/or twist angle may occur along the length 120.

As used herein, a "local maximum" is a point where a measurement is greater than or equal to the measurements of nearby points. That is, the local maximum may be a point that has a greater measurement than nearby points, but it may or may not have the largest measurement of all points. Similarly, as used herein, a "local minimum" is a point where a measurement is less than or equal to the measurements of nearby points. That is, the local minimum may be a point that has a lower measurement than the nearby points, but it may or may not have the lowest measurement of all points. Note that it is possible for a blade design 100 to have multiple local maximum and/or multiple local minimum over the length 120.

In some embodiments, the twist angle of the blade design 100 may change along the length 120 of the blade design 100. For example, at inflection point 135b the chord 115a is at a different angle than the chord 115b at inflection point 135d. In the present disclosure, when the chord increases near the second end 130 the twist angle may also increase (see FIGS. 2A-2B).

For the example of a wind turbine rotor blade, the blade design 100 may enhance wake recovery, and may have the potential to increase aerodynamic power by approximately 5% compared to traditional wind turbine rotor blades 200. The changes in chord 115 measurement and/or twist angle may be within the last approximately 25% of the length 120. The blade design 100 may reduce the downwash from the tip vortex of the blade which may result in increasing the efficiency of the blade.

Figure 2A:
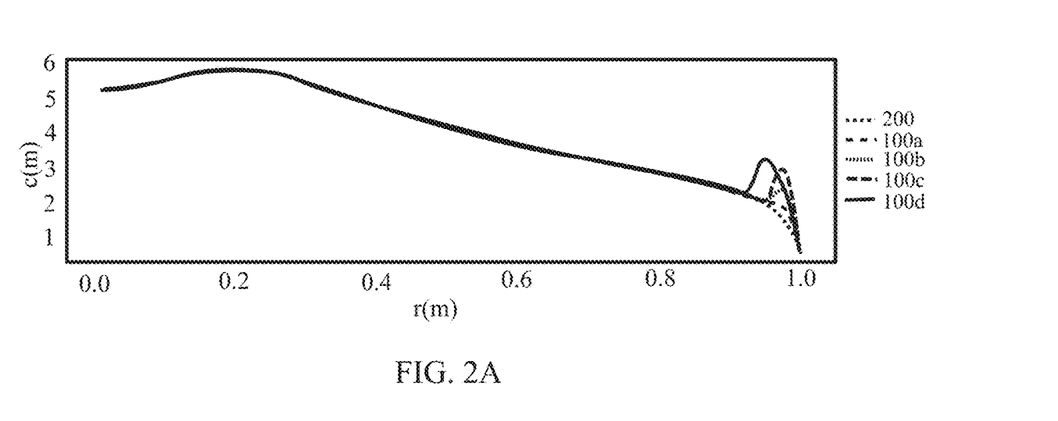
FIG. 2A illustrates chord measurements and FIG. 2B illustrates twist angle measurements for exemplary embodiments of the blade design, according to some aspects of the present disclosure.
Figure 2B:
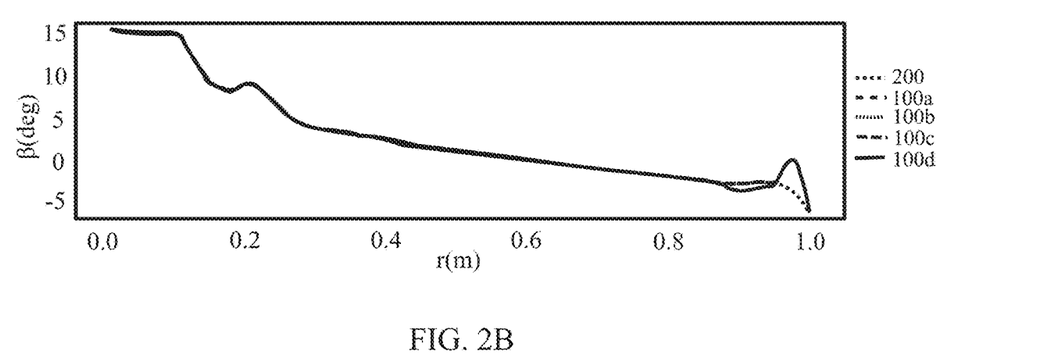

FIG. 2A illustrates chord 115 measurements and FIG. 2B illustrates twist angle measurements for exemplary embodiments of the blade design 100, according to some aspects of the present disclosure. The chord 115 (shown as c) measurements in this experiment were in the range of approximately 0.2 m to approximately 5.8 m. The length 120 (shown as r) in this experiment was normalized, although traditional wind turbine blades could be used (i.e., in the range of approximately 10 m to approximately 80 m) or traditional aircraft wings (i.e., in the range of approximately 2 m to approximately 50 m). The twist angles were in the range of approximately −5.5° to approximately 15.5°. As shown in FIGS. 2A-B, in the last approximately 10% of the blade design 100 length 120, the chord 115 and twist angle were increased. While both the chord 115 and the twist angle change multiple times along the length 120 (at various inflection points 135), they both change from continuing to decrease to suddenly increasing in the last 10% of the length 120.

The embodiment of blade designs 100a-d shown in FIGS. 2A-B include various chord 115 and twist angle changes. Blade design 100d includes the chord 115 change being slightly further from the second end 130 and including a greater change in the twist angle. Additionally, blade design 100d includes small perturbations in the chord 115 and twist angle at three additional locations along the length 120.

As shown in FIGS. 2A-B, in the last approximately 10% of the length 120 the chord 115 may be increased in the range of approximately 0.5 m to approximately 2 m and the twist angle may be increased in the range of approximately 1° to approximately 5°. Note that these ranges are exemplary for these experiments and not limiting. In some embodiments the chord change may be less than approximately 10 m and the twist angle may be less than approximately 25°.

Table 1 shows coefficient of power ($C_P$) calculated using blade element momentum (BEM) theory, free-wake vortex (FWV) model, and blade resolved (BR) computational fluid dynamics for the blade designs 100 of the present disclosure shown in FIGS. 2-B.

TABLE 1

$C_P$ values for blade designs 100 of the present disclosure.

|  | BEM | FWV | BR |
|---|---|---|---|
| 100a | 0.481 | 0.496 | 0.500 |
| 100b | 0.481 | 0.499 | 0.501 |
| 100c | 0.480 | 0.500 | 0.500 |
| 100d | 0.479 | 0.499 | 0.503 |

Table 2 shows values, coefficient of thrust ($C_T$) calculated using BEM, FWV, and BR for the blade designs 100 of the present disclosure shown in FIGS. 2-B.

TABLE 2

$C_T$ values for blade designs 100 of the present disclosure.

|  | BEM | FWV | BR |
|---|---|---|---|
| 100a | 0.799 | 0.818 | 0.856 |
| 100b | 0.803 | 0.825 | 0.861 |
| 100c | 0.807 | 0.832 | 0.866 |
| 100d | 0.818 | 0.844 | 0.880 |

As shown in Tables 1-2, when calculated using new blade theories, increasing the chord 115 and twist angle near the second end 130 shows promise for increasing the power and thrust of a blade. BEM (the traditional method) does not predict a significant increase in $C_P$ with the change in chord 115 and twist angle near the second end 130. However, FWV, which is a newer theory taking into account the helical trailing vortex structure generated by a blade and uses the net effect of these vortices to estimate various quantities of interest along a blade, shows increases in $C_P$ and $C_T$ with increases in the chord 115 and twist angle near the second end 130. From Tables 1-2, the blade design 100 may have a $C_P$ in the range of approximately 0.45 to approximately 0.55 and a $C_T$ in the range of approximately 0.75 to approximately 0.95.

Figure 3:
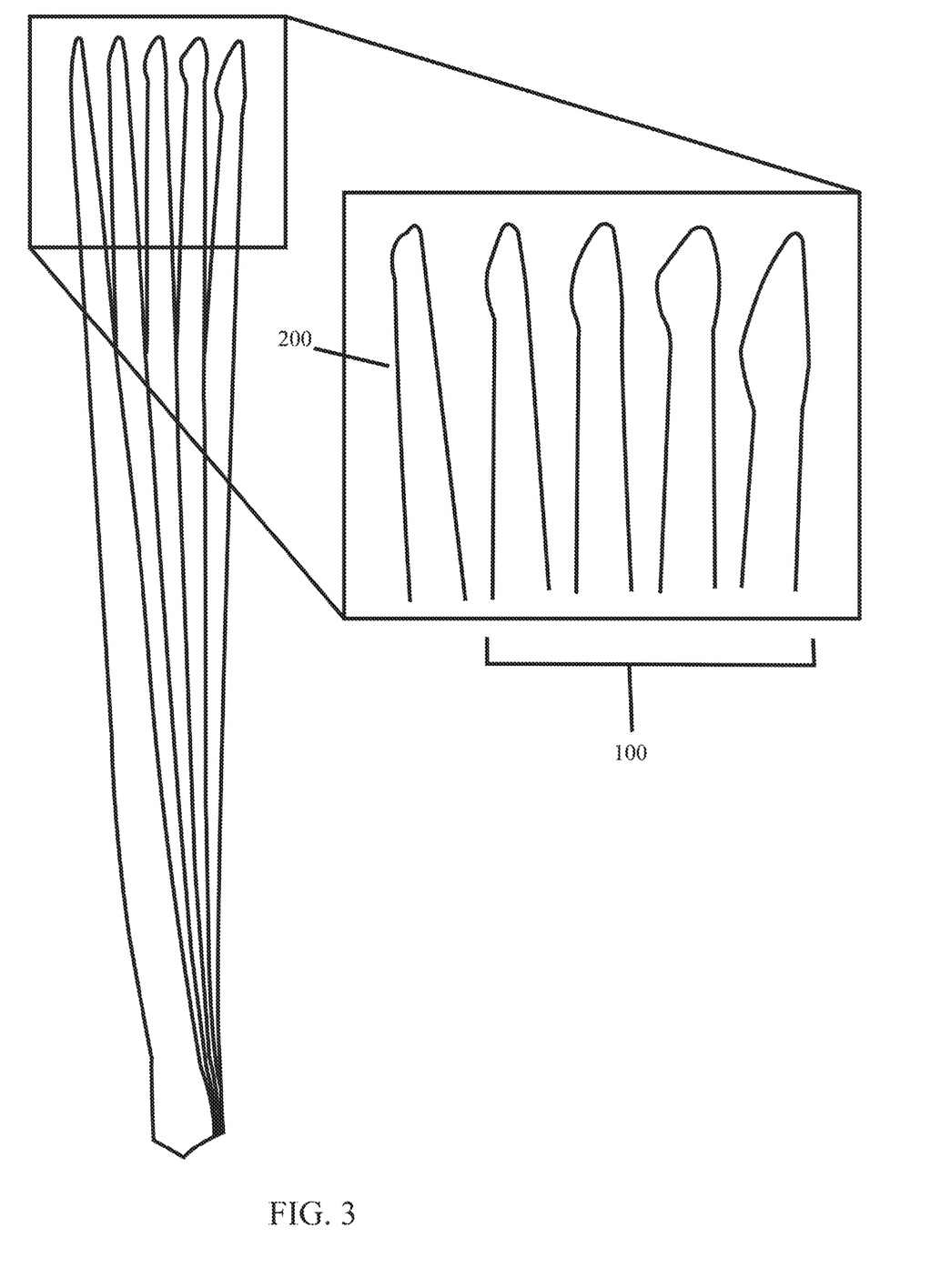
FIG. 3 illustrates exemplary shapes of tips for the blade design, according to some aspects of the present disclosure.

FIG. 3 illustrates exemplary shapes of tips for the blade design 100, according to some aspects of the present disclosure. These tips show the various orientations that an increase in chord 115 measurement and/or twist angle can take. The embodiments shown in FIG. 3 demonstrate that the increase in chord 115 and/or twist angle may occur very close to the second end 130 (i.e., with less than approximately 5% of the length 120 between the local minima/inflection point 135c and the second end 130) or may be slightly further out (i.e., with less than approximately 25% of the length 120 between the local minima/inflection point 135c and the second end 130). The shapes shown in FIG. 3 are examples only and not intended to be limiting. The shape resulting from the increase in chord 115 and/or twist angle may be substantially curved, substantially angular, or a mixture thereof. Note that in some embodiments, multiple increases in chord 115 measurement and/or twist angles may occur along the length 120.

Figure 4:
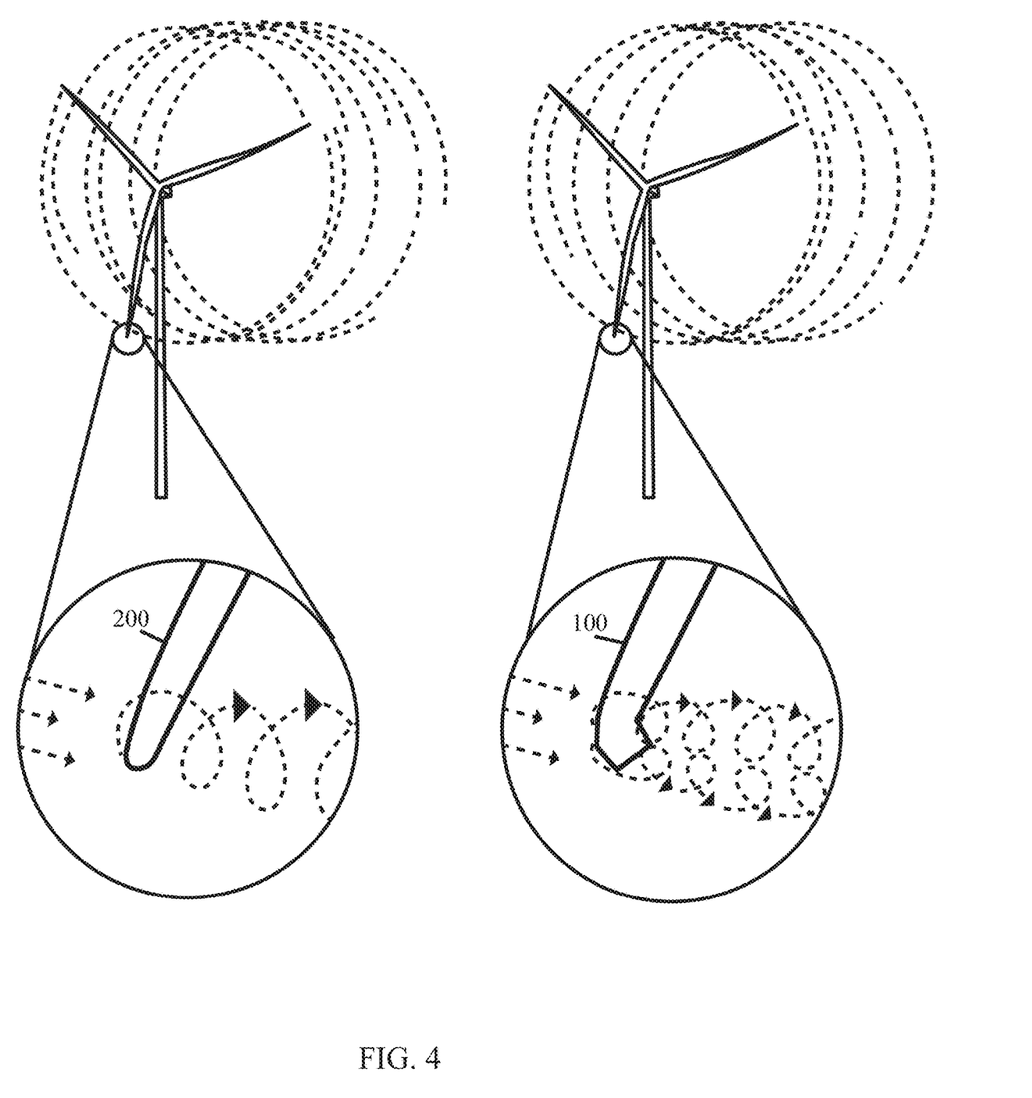
FIG. 4 illustrates the change in trailing vortices between a traditional wind turbine blade and the blade design of the present disclosure, according to some aspects of the present disclosure.

FIG. 4 illustrates the change in trailing vortices between a traditional wind turbine blade and the blade design of the present disclosure, according to some aspects of the present disclosure. As shown in FIG. 4, the blade design 100 may change the vortices tailing the second end 130, creating greater power generation (or lift in the case of an aircraft wing/airfoil). FIG. 4 shows how blade design 100 may create counter-rotating vortices which may help minimize the downwash on the blade design 100. The vortices may be considered as a physical quantity which has a vortex size. In standard theories, including BEM, the vortices are infinitesimally thin. However, for the blade design 100 of the present disclosure it was assumed that at every blade section the vortices have a thickness which is proportional to the chord 115 size at that blade section. The velocity induced by each vortex was described using a Lamb-Oseen vortex. The formula for the induced velocity by a Lamb-Oseen vortex is given by:

$$u_r = \Gamma/r(1-\exp(-r^2/\in^2))$$ Eqn. 1 where $\Gamma$ is the circulation value at the blade section, r is the distance from the center of the blade section, and $\in$ is the width of the vortex. In traditional lifting line theory, $\in$ is assumed to be zero, which yields nonphysical results. However, under new theories, the blade design 100 may generate a plurality of vortices and/or a counter-rotating vortex.

The blade design 100 as described herein are based on two primary findings: 1) the velocities induced by the vortex are not strongest in the nearest vicinity of the blade section, and 2) the vortex core size is proportional to the chord 115 of the blade at approximately every blade section. Typically, in traditional blade designs, the chord of airplane wings and wind turbine blades decreases toward the tip (i.e., the second end 130). The blade design 100 as described herein alters the chord 115 towards the second end 130 of the blade in the last approximately 90% of the blade span.

Figure 5:
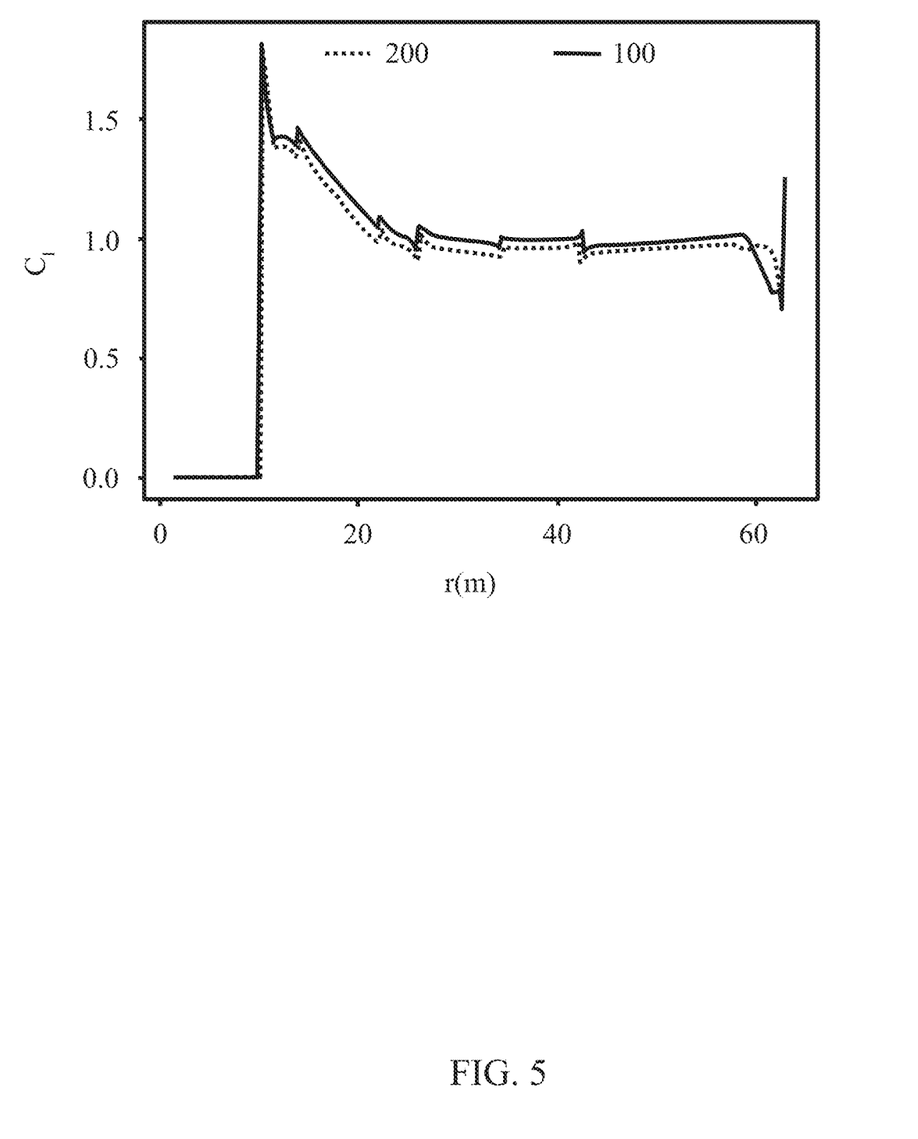
FIG. 5 illustrates improvements in the coefficient of lift ($C_l$) between a traditional wind turbine blade and the blade design of the present disclosure, according to some aspects of the present disclosure.

FIG. 5 illustrates improvements in the coefficient of lift (Ci) between a traditional wind turbine blade 200 and the blade design 100 of the present disclosure, according to some aspects of the present disclosure. As shown in FIG. 5, along the length 120 the blade design 100 of the present disclosure has a higher $C_l$ than a traditional wind turbine blade 200. This is particularly apparent towards the tip (or second end 130), where traditional wind turbine blades 200 show a sudden decrease in $C_l$ but the blade design 100 of the present disclosure shows a sharp increase in $C_l$.

Figure 6A:
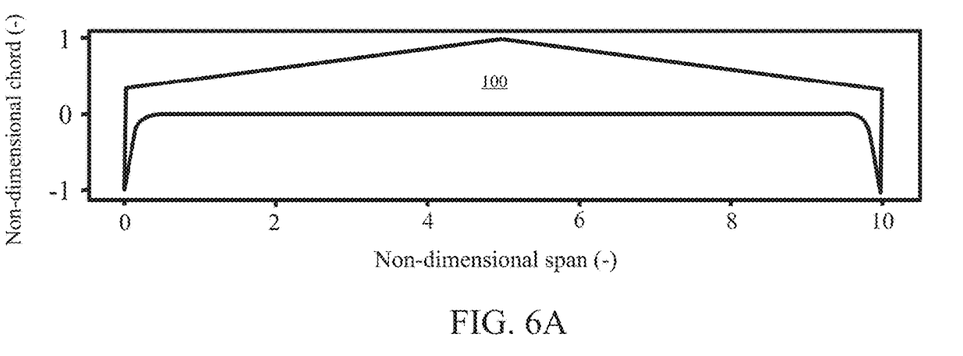
Figure 6B:
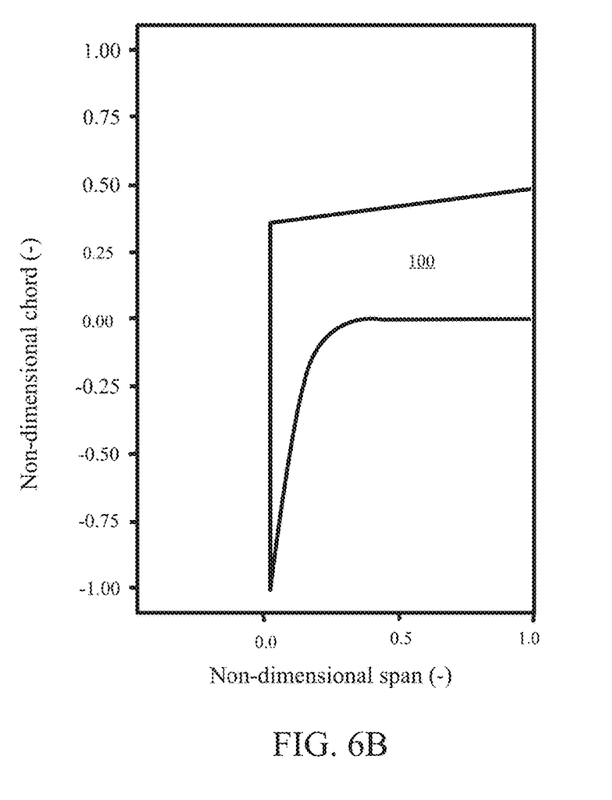
FIG. 6B illustrates a detailed view of the tip of the blade design in an aircraft wing or airfoil, according to some aspects of the present disclosure.

FIG. 6A illustrates an embodiment of the blade design 100 for use in aircraft wing or airfoil, FIG. 6B illustrates a detailed view of the tip of the blade design 100 in an aircraft wing or airfoil, according to some aspects of the present disclosure. The span in FIGS. 6A-B may be considered the length 120 of the blade design 100 for this embodiment. As shown in FIGS. 6A-B, for the embodiment of the blade design 100 in an aircraft wing or airfoil, the chord 115 may increase by approximately 150% in the approximately 5% of the length 120 near the first end 125 and second end 130.

In some embodiments, when the blade design 100 is used for an aircraft wing or airfoil, a non-dimensional chord 115 profile along the span of the blade design 100, may be defined by:

$$c(r) = C + C_{tip}(1-\tan h(Ar))$$ Eqn. 2 where r is the distance from the second end 130, C is the measurement of the chord 115 at the second end 130, $C_{tip}$ is the new chord 115 measurement at the second end 130, and A is a factor to determine the approximate width of the blade design.

The concepts of the blade design 100 could have many applications, including wind turbine rotor blades, airfoils (or airplane wings), or fan or other aerodynamic component. The aerodynamics of blades for different applications may vary slightly. The blade design 100 may include an increase in chord 115 measurement towards the second end 130 of the blade which may create a plurality of counter-rotating vortices that may reduce the impact of the tip-vortex on the blade design 100. The blade design 100 may increase the chord 115 linearly from approximately 95% of the length 120 to approximately 97% and then decrease back to approximately 100% of the length 120. The counter-rotating vortices may interact with the tip-vortex to reduce the strength of the tip vortex and thus reduce the indication throughout the blade. This may lead to a performance gain for the blade design 100 (see FIGS. 4-5). For example, when the blade design 100 is used for a wind turbine rotor blade, this may lead to an increase in power harnessed from the wind. In the example when the blade design 100 is used for an aircraft wing or airfoil (as shown in FIG. 6) this may result in increased lift.

Examples

Example 1. A blade comprising:
a length having a first end and a second end; and
a leading edge;
a tailing edge; and
a chord between the leading edge and the tailing edge;
wherein:
the chord is substantially perpendicular to the length,
the chord has a local chord minimum at a first inflection point,
the chord has a local chord maximum at a second inflection point, and
the local chord maximum is closer to the second end than the local chord minimum.

Example 2. The blade of Example 1, further comprising:
a twist; wherein:
the twist has a local angle minimum at the first inflection point,
the twist has a local angle maximum at the second inflection point, and
the local angle maximum is closer to the second end than the local angle minimum.

Example 3. The blade of Example 2, wherein:
the local angle maximum is in the range of approximately 1° to approximately 15° larger than the local angle minimum.

Example 4. The blade of Example 2, wherein:
the local angle maximum is approximately 5° larger than the local angle minimum.

Example 5. The blade of Example 1, wherein:
the first inflection point is located at approximately 90% of the length.
Example 6. The blade of Example 1, wherein:
the first inflection point is located at approximately 95% of the length.
Example 7. The blade of Example 1, wherein:
the first inflection point is located at approximately 97% of the length.
Example 8. The blade of Example 1, wherein:
the second inflection point is located at approximately 90% of the length.
Example 9. The blade of Example 1, wherein:
the second inflection point is located at approximately 95% of the length.
Example 10. The blade of Example 1, wherein:
the second inflection point is located at approximately 97% of the length.
Example 11. The blade of Example 1, wherein:
the leading edge has a profile that is substantially linear, and the tailing edge has a profile that is substantially nonlinear.
Example 12. The blade of Example 1, wherein:
the local chord maximum is in the range of 0.5 m to 5 m larger than the local chord minimum.
Example 13. The blade of Example 6, wherein:
the local chord maximum is approximately 1 m larger than the local chord minimum.
Example 14. The blade of Example 1, wherein:
the wind turbine blade has a power coefficient in the range of approximately 0.45 to approximately 0.55.
Example 15. The blade of Example 1, wherein:
the wind turbine blade has a thrust coefficient in the range of approximately 0.75 to approximately 0.95.
Example 16. The blade of Example 1, wherein:
the blade is connected to a wind turbine nacelle.
Example 17. The blade of Example 1, wherein:
the blade is connected to an aircraft fuselage.
Example 18. A blade comprising:
a length having a first end and a second end; and
a leading edge;
a tailing edge; and
a chord between the leading edge and the tailing edge; wherein:
the chord is substantially perpendicular to the length,
the chord has a first length at a first inflection point,
the chord has a second measurement at a second inflection point,
the chord has a third measurement at a third inflection point,
the chord has a fourth measurement at a fourth inflection point, and
the third measurement is less than the second measurement and the fourth measurement.
Example 19. The blade of Example 18 further comprising:
a twist; wherein:
the twist has a first pitch angle at the first inflection point,
the twist has a second pitch angle at the second inflection point,
the twist has a third pitch angle at the third inflection point,
the twist has a fourth pitch angle at the fourth inflection point, and
the third pitch angle is less than the second pitch angle and the fourth pitch angle.

Example 20. The blade of Example 19, wherein:
the second pitch angle and the fourth pitch angle are in the range of approximately 1° to approximately 15° larger than the third pitch angle.
Example 21. The blade of Example 19, wherein:
the fourth pitch angle is approximately 5° larger than the third pitch angle.
Example 22. The blade of Example 19, wherein:
the fourth pitch angle is approximately 2° greater than the third pitch angle.
Example 23. The blade of Example 18, wherein:
the leading edge has a profile that is substantially linear, and the tailing edge has a profile that is substantially nonlinear.
Example 24. The blade of Example 18, wherein:
the second measurement is approximately 4 m larger than the third measurement, and
the fourth measurement is approximately 1 m larger than the third measurement.
Example 25. The blade of Example 18, wherein:
the chord has a fifth measurement at the second end, and
the fifth measurement is smaller than the first measurement, the second measurement, the third measurement, or the fourth measurement.
Example 26. The blade of Example 18, wherein:
the third inflection point is located at approximately 90% of the length.
Example 27. The blade of Example 18, wherein:
the third inflection point is located at approximately 95% of the length.
Example 28. The blade of Example 18, wherein:
the third inflection point is located at approximately 97% of the length.
Example 29. The blade of Example 18, wherein:
the fourth inflection point is located at approximately 90% of the length.
Example 30. The blade of Example 18, wherein:
the fourth inflection point is located at approximately 95% of the length.
Example 31. The blade of Example 18, wherein:
the fourth inflection point is located at approximately 97% of the length.
Example 32. The blade of Example 18, wherein:
the wind turbine blade has a power coefficient in the range of approximately 0.45 to approximately 0.55.
Example 33. The blade of Example 18, wherein:
the wind turbine blade has a thrust coefficient in the range of approximately 0.75 to approximately 0.95.
Example 34. The blade of Example 18, wherein:
the blade is connected to a wind turbine nacelle.
Example 35. The blade of Example 18, wherein:
the blade is connected to an aircraft fuselage.

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

What is claimed is:

1. A blade comprising:
a length having a first end and a second end; and
a leading edge;
a tailing edge;
a twist; and
a chord between the leading edge and the tailing edge;
wherein:
the chord is substantially perpendicular to the length,
the chord has a local chord minimum at a first inflection point,
the chord has a local chord maximum at a second inflection point,
the local chord maximum is closer to the second end than the local chord minimum,
the twist has a local angle minimum at the first inflection point,
the twist has a local angle maximum at the second inflection point, and
the local angle maximum is closer to the second end than the local angle minimum.

2. The blade of claim 1, wherein:
the local angle maximum is in the range of approximately 1° to approximately 15° larger than the local angle minimum.

3. The blade of claim 1, wherein:
the first inflection point is located at approximately 90% of the length.

4. The blade of claim 1, wherein:
the first inflection point is located at approximately 95% of the length.

5. The blade of claim 1, wherein:
the first inflection point is located at approximately 97% of the length.

6. The blade of claim 1, wherein:
the second inflection point is located at approximately 90% of the length.

7. The blade of claim 1, wherein:
the second inflection point is located at approximately 95% of the length.

8. The blade of claim 1, wherein:
the second inflection point is located at approximately 97% of the length.

9. The blade of claim 1, wherein:
the local chord maximum is in the range of 0.5 m to 5 m larger than the local chord minimum.

10. The blade of claim 1, wherein:
the wind turbine blade has a power coefficient in the range of approximately 0.45 to approximately 0.55.

11. The blade of claim 1, wherein:
the wind turbine blade has a thrust coefficient in the range of approximately 0.75 to approximately 0.95.

12. A blade comprising:
a length having a first end and a second end; and
a leading edge;
a tailing edge;
a twist; and
a chord between the leading edge and the tailing edge;
wherein:
the chord is substantially perpendicular to the length,
the chord has a first length at a first inflection point,
the chord has a second measurement at a second inflection point,
the chord has a third measurement at a third inflection point,
the chord has a fourth measurement at a fourth inflection point, and
the third measurement is less than the second measurement and the fourth measurement the twist comprises:
a first pitch angle at the first inflection point;
a second pitch angle at the second inflection point;
a third pitch angle at the third inflection point; and
a fourth pitch angle at the fourth inflection point;
wherein:
the third pitch angle is less than the second pitch angle and the fourth pitch angle.

13. The blade of claim 12, wherein:
the second pitch angle and the fourth pitch angle are in the range of approximately 1° to approximately 15° larger than the third pitch angle.

14. The blade of claim 12, wherein:
the second measurement is approximately 4 m larger than the third measurement, and
the fourth measurement is approximately 1 m larger than the third measurement.

15. The blade of claim 12, wherein:
the chord has a fifth measurement at the second end, and
the fifth measurement is smaller than the first measurement, the second measurement, the third measurement, or the fourth measurement.

16. The blade of claim 12, wherein:
the third inflection point and the fourth inflection point are located within approximately 90% of the length.

17. The blade of claim 12, wherein:
the wind turbine blade has a power coefficient in the range of approximately 0.45 to approximately 0.55.

18. The blade of claim 12, wherein:
the wind turbine blade has a thrust coefficient in the range of approximately 0.75 to approximately 0.95.

* * * * *